United States Patent [19]

Burley et al.

[11] Patent Number: 5,114,535

[45] Date of Patent: May 19, 1992

[54] PROCESS FOR THE PRODUCTION OF CELLULOSE ACETATE FROM WOOD PULP

[75] Inventors: Richard Burley, Derby; Patrick Roche, Derbyshire, both of United Kingdom

[73] Assignee: Courtaulds PLC, Great Britain

[21] Appl. No.: 671,679

[22] Filed: Mar. 19, 1991

Related U.S. Application Data

[63] Continuation of Ser. No. 402,837, Sep. 6, 1981, abandoned.

[30] Foreign Application Priority Data

Sep. 6, 1988 [GB] United Kingdom ............... 8820905

[51] Int. Cl.$^5$ ........................... C08B 3/06; D21C 1/06
[52] U.S. Cl. ............................ 162/9; 162/23; 162/76; 162/157.6; 536/69; 536/70; 536/71
[58] Field of Search ............ 536/69, 70, 71; 162/9, 162/23, 56, 18, 63, 207, 157.6, 26; 241/1, 28

[56] References Cited

U.S. PATENT DOCUMENTS

| | | |
|---|---|---|
| 1,851,008 | 5/1932 | Hanson et al. |
| 2,008,021 | 7/1935 | Kenety |
| 2,054,301 | 9/1936 | Richter ........................ 92/1 |
| 2,105,498 | 1/1938 | Parrett et al. |
| 2,393,783 | 1/1946 | Kridel ........................ 241/1 |
| 2,478,396 | 8/1949 | Hincke et al. ................ 260/225 |
| 2,603,637 | 7/1952 | Blackman et al. ............ 260/229 |
| 4,601,759 | 7/1986 | Furubayashi et al. ........ 106/436 |
| 5,036,900 | 8/1991 | Burley et al. ................ 162/9 |

FOREIGN PATENT DOCUMENTS 343712 2/1931 United Kingdom.
888845 2/1962 United Kingdom.

*Primary Examiner*—Steve Alvo
*Attorney, Agent, or Firm*—Howson and Howson

[57] ABSTRACT

A process for making cellulose acetate from wood pulp takes wet wood pulp and instead of converting it into dry pulp sheet which is the usual feedstock for acetate, dries and mechanically separates the pulp into a cellulose flock using a pin mill through which a hot drying gas is passed. Deactivation of the cellulose is avoided by control of the drying gas exit temperature to 80° C. to 95° C. and of the moisture content of the cellulose flock to 4 to 15% by weight. The flock produced may be acetylated directly without any need for reactivation treatments additional to the normal activation with acetic acid.

3 Claims, No Drawings

PROCESS FOR THE PRODUCTION OF CELLULOSE ACETATE FROM WOOD PULP

This is a continuation of application Ser. No. 07/402,837, filed on Sep. 6, 1989, now abandoned.

This invention relates to the production of cellulose acetate from wood pulp.

The cellulose feed-stock used in commercial production processes for making cellulose acetate (commonly known as the acetate process) is either cotton linters or wood pulp supplied in sheet form. Sheet wood pulp is produced by forming a layer of wet wood pulp on the flat bed conveyor of a vacuum drier and compressing the layer between squeeze rollers to form the required sheet. Grades of sheet pulp to be used for the acetate process have conventionally been produced in a softer (i.e. less compressed) form than the harder sheets used for the viscose rayon process. The reason for this is that deactivation of the pulp occurs, leading to difficult and uneven acetylation reactions in the acetate-making processes, if the pulp is compressed to the extent used in producing viscose rayon grades of sheet pulp. It is believed that this deactivation occurs both in the compression of the sheet itself and, later, in the mechanical processes used to break up the sheet prior to acetylation. The softer sheet is produced for the pulp to be used in the acetate process in order to avoid such deactivation.

Wood pulp for the viscose rayon process is also produced in the form of a cellulose flock. For this purpose, a pressed slurry of wood pulp is dried in a high-temperature stream of gas whilst mechanically breaking it up to facilitate rapid drying and fluff up the cellulose into the form known as cellulose flock. A pin mill through which a hot gas is passed is used for this process. Rapid drying to the desired moisture content for the viscose process, about 7% by weight, is achieved using drying conditions which give an exit temperature for the flock leaving the drier of about 130° C.

Whilst the cellulose flock produced in this way is acceptable for use in the viscose rayon process, it is unsuitable for use as a feedstock for the acetate process because it is severely deactivated and produces poor quality acetate. This manifests itself as incompletely esterified portions of cellulose which lead to poor filterability of the cellulose acetate product.

Processes are known for reactivating cellulose which has become deactivated. One such process is described in British Patent No. 714,163 in which batches of cellulose having different moisture contents and different moisture histories are treated to try to make them uniform in their reactivity to esterification so that they may be esterified under standard conditions. This process involves rewetting the cellulose, which is specifically in the form of cotton linters, using a water spray and then re-drying it under controlled, uniform conditions. This process is expensive in energy usage because of the repeated drying operation. Furthermore, drying at the proposed low temperature range of 25° C. to 65° C. reduces throughput considerably and makes the process uneconomic, especially with wood pulp.

A reactivation process for sheet wood pulp is described in our co-pending U.S. patent application Ser. No. 379,004, filed Jul. 12, 1989, and now abandoned and refiled on Oct. 17, 1990 as Ser. No. 600,164, now U.S. Pat. No. 5,036,900 filed Jul. 11, 1989 in the names of Richard Burley and Lucjan Stanislaw Slota. This process allows the use for acetate production of a sheet pulp which is of the grade used for viscose rayon production and which is normally unsuitable for use in making acetate because of deactivation. The sheet pulp has to be broken up mechanically prior to acetylation. Such breaking up would normally tend to reinforce the deactivation but in the case of the process referred to, the sheet pulp is first treated with water and is then dried whilst being mechanically broken up, for example in a pin mill. Care is taken not to re-introduce deactivation by keeping the exit temperature of the dried pulp below 110° C. and maintaining its moisture content in the range 4 to 15% by weight (based on the dry weight of the cellulose material).

The present invention is concerned with a process for producing cellulose acetate from wood pulp, which process does not involve the use of a cellulose feedstock in the form of sheet wood pulp and which does not require any reactivation treatment of the pulp additional to the normal activation treatment with acetic acid prior to acetylation.

According to this invention, a process for the production of cellulose acetate from wood pulp comprises forming a slurry of the wood pulp in water, passing the slurry through a press to remove water, drying the pressed slurry to form dried cellulose material and subsequently esterifying the dried cellulose material with an acetylating agent after activation with acetic acid to form cellulose acetate, and is characterised in that the pressed slurry of wood pulp is dried in a pin mill through which a hot drying gas is passed under conditions which produce an exit temperature of the drying gas in the range 80° C. to 95° C. and a moisture content of the dried cellulose material in the range 4 to 15% by weight (based on the dry weight of the material) to provide a dried cellulose material in the form of a cellulose flock which does not require reactivation prior to acetylation additional to the normal activation with acetic acid.

The invention also provides wood pulp suitable for use in the production of cellulose acetate, said pulp being characterised by being in the form of a cellulose flock having a moisture content of 4 to 15% by weight based on the weight of dry cellulose material, which flock does not require reactivation prior to acetylation additional to the normal activation with acetic acid.

The use of cellulose flock as a feedstock for cellulose acetate production is a new departure and is made possible by producing the flock under conditions which do not allow deactivation to take place. In this way, good quality cellulose acetate can be made without the need for expensive reactivation procedures.

In the process of the invention, the pressed wood pulp is mechanically fluffed up into a cellulose flock whilst it is being dried. This mechanical action is produced by using a pin mill, preferably of the Atritor type, through which a hot gas is passed. It allows the drying to be both rapid and even, because the wood pulp fibres are separated as they are dried and the chance of localised hot-spots is reduced. In conjunction with this, two important conditions are applied. Firstly, the exit temperature of the drying gas leaving the pin mill is controlled to be in the range 80° C. to 95° C., preferably 80° C. to 90° C., so that a reasonable rate of heating is maintained but the temperature is kept below a level which can produce localised over-heating and over-drying of the cellulose. Secondly, the moisture content of the cellulose flock leaving the pin mill is controlled to be in the range 4 to 15% by weight. Below a 4% moisture level localised over-drying produces deactivated portions of flock. More than 15% moisture tends to make the process less economic because, for a given throughput, an increased quantity of acetylating agent is required owing to the additional water. Also, in transporting flock around the world it is desirable to minimise the amount of water being transported at the same time. A preferred moisture content of the cellulose flock leaving the pin mill is in the range 5 to 10% by weight based on the weight of dry cellulose material.

The cellulose flock is carried out of the pin mill by drying gas and so its temperature will be similar to or slightly below that of the drying gas. Thus, the exit temperature of the flock from the drier will in general be below 95° C., preferably not above 90° C. This drying gas exit temperature is monitored and controlled within the specified limits, preferably by controlling the drying gas inlet temperature using conventional control equipment. Gas inlet temperatures in the range 300° C. to 550° C., more preferably 350° C. to 450° C., may be used.

The drying gas may have air as a component but preferably has a reduced oxygen content compared with air, for example containing about 8% by volume, for reasons of safety.

The conversion of the cellulose flock into cellulose acetate may be carried out in a conventional manner and under conventional conditions. Acetylation is preferably effected using acetic anhydride, with the flock being activated by acetic acid either in a separate pretreatment step or as part of the acetylation step.

The invention is illustrated with reference to the following Examples, of which Example 1 is comparative. Parts are by weight.

In the Examples, the quality of the cellulose acetate, which is in the form of flake, is measured by its plugging value which is also known as filterability value. Plugging value is defined as the amount of dry cellulose acetate, in the form of a dope consisting of 7.5% by weight cellulose acetate dissolved in a solvent consisting of 95% by weight acetone and 5% by weight water, that will filter through a specified filter pad per unit area before the filter pad becomes blocked by insoluble, non-acetylated pulp fibres present in the material. The filter pad is 1 cm square and consists of 30 layers of KIMPAK filter papers sandwiched between swansdown. On the topside, the swandown consists of two swansdown layers with the fluffed sides facing one another. On the underside, it consists of three swansdown layers with the two layers nearest the filter papers having their fluffed sides facing one another and the bottom layer having its fluffed side facing away from the filter papers.

The higher the plugging value, the better the quality of the flake. In general a plugging value of 30 g cm$^{-2}$ or more indicates an acceptable quality flake.

EXAMPLE 1

An aqueous slurry of wood pulp having an alpha content of 92% was passed through a press to remove water and then the pressed slurry was passed through an Atritor pin mill drier operated at a drying gas exit temperature of about 130° C. to produce a cellulose flock having a moisture content of about 7% by weight based on the dry weight of the material, 100 parts of the resulting cellulose flock were sprayed with 37.5 parts of glacial acetic acid and mixed in a pre-treatment vessel at a temperature of 30° C. for 60 minutes. The pre-treated cellulose was then esterified under standard esterification conditions, i.e. with a mixture consisting of 260 parts of acetic anhydride, 370 parts of glacial acetic acid and 15 parts of concentrated sulphuric acid which had been cooled to a temperature of −15° C. After hydrolysis and neutralisation, the cellulose acetate flake produced had a plugging value of less than 10 g cm$^{-2}$, indicating its extremely poor quality.

EXAMPLE 2

A similar wood pulp slurry was passed through a press to remove water and then through an Atritor pin mill drier operated at a drying gas exit temperature of about 85° C. to produce a cellulose flock having a moisture content of about 13% by weight based on the dry weight of the material.

The cellulose flock was pre-treated and esterified with acetic anhydride under identical conditions to those used in Example 1 except that the acetic anhydride level was increased from 260 to 285 parts to allow for the increased moisture content. The cellulose acetate flake produced had a plugging value of 38 g cm$^{-2}$.

EXAMPLE 3

A cellulose flock produced as described in Example 2 was pre-treated and esterified with acetic anhydride in a production plant using identical esterification conditions to those in Example 1 except that the weight of cellulose was reduced from 100 to 98.6 parts to allow for the high moisture content but the acetic anhydride level was not increased. In three separate trials cellulose acetate flakes having plugging values of 42, 52 and 53 g cm$^{-2}$ respectively were obtained.

EXAMPLE 4

A cellulose flock produced as described in Example 2 was pre-treated with acetic acid as described in Example 1 and then esterified using an esterification process based on methylene chloride as co-solvent. 100 parts of the pretreated cellulose flock were esterified at a temperature of 65° C. using a mixture of 270 parts of acetic anhydride, 340 parts of methylene chloride, 60 parts of glacial acetic acid and 2 parts of concentrated sulphuric acid. The cellulose acetate flake produced had a plugging value of 40 g cm$^{-2}$.

What is claimed is:

1. A process for the production of cellulose acetate from wood pulp which comprises forming a slurry of the wood pulp in water, passing the slurry through a press to remove water, drying the pressed slurry to form dried cellulose material under conditions which do not allow deactivation to take place, activating the dried material with acetic acid, and subsequently esterifying the dried cellulose material with an acetylating agent after said activation with acetic acid to form cellulose acetate, wherein the activation with acetic acid is the only activation of the process, in which process the pressed slurry of wood pulp is dried in a pin mill through which a hot drying gas is passed under conditions which produce an exit temperature of the drying gas in the range 80° C. to 95° C. and a moisture content of the dried cellulose material in the range 4 to 15% by weight, based on the dry weight of the material, to provide a dried cellulose material in the form of a cellulose flock.

2. A process as claimed in claim 1, wherein the cellulose flock issuing from the pin mill has a moisture content in the range 5 to 10% by weight based on the weight of dry material.

3. A process as claimed in claim 1, wherein the exit temperature of the drying gas is in the range 80° C. to 90° C.

* * * * *

UNITED STATES PATENT AND TRADEMARK OFFICE
CERTIFICATE OF CORRECTION

PATENT NO. : 5,114,535

DATED : May 19, 1992

INVENTOR(S) : Richard Burley and Patrick Roche

It is certified that error appears in the above-identified patent and that said Letters Patent is hereby corrected as shown below:

Col. 1, line 67, "filed July 11, 1989" should be deleted.

Signed and Sealed this

Seventeenth Day of August, 1993

*Attest:*

BRUCE LEHMAN

*Attesting Officer*  *Commissioner of Patents and Trademarks*